United States Patent
Nakajo

(10) Patent No.: US 10,297,036 B2
(45) Date of Patent: May 21, 2019

(54) RECORDING MEDIUM, INFORMATION PROCESSING APPARATUS, AND DEPTH DEFINITION METHOD

(71) Applicant: Live2D Inc., Tokyo (JP)

(72) Inventor: Tetsuya Nakajo, Tokyo (JP)

(73) Assignee: Live2D Inc., Tokyo (JP)

( * ) Notice: Subject to any disclaimer, the term of this patent is extended or adjusted under 35 U.S.C. 154(b) by 0 days.

(21) Appl. No.: 15/435,024

(22) Filed: Feb. 16, 2017

(65) Prior Publication Data

US 2017/0161918 A1 Jun. 8, 2017

Related U.S. Application Data

(63) Continuation of application No. PCT/JP2016/065161, filed on May 23, 2016.

(30) Foreign Application Priority Data

Jul. 1, 2015 (JP) ................................ 2015-133122

(51) Int. Cl.
| | | |
|---|---|---|
| G06T 7/50 | (2017.01) | |
| G06T 17/10 | (2006.01) | |
| G06T 11/20 | (2006.01) | |
| G06T 19/20 | (2011.01) | |
| H04N 13/128 | (2018.01) | |

(52) U.S. Cl.
CPC .............. *G06T 7/50* (2017.01); *G06T 11/203* (2013.01); *G06T 17/10* (2013.01); *G06T 19/20* (2013.01); *H04N 13/128* (2018.05); *G06T 2219/2021* (2013.01)

(58) Field of Classification Search
None
See application file for complete search history.

(56) References Cited

U.S. PATENT DOCUMENTS

| | | | |
|---|---|---|---|
| 2013/0057540 A1* | 3/2013 | Winnemoeller | G06T 15/80 345/419 |
| 2013/0063430 A1* | 3/2013 | Kwon | H04N 13/271 345/419 |
| 2016/0042518 A1* | 2/2016 | Nam | G06T 7/0051 345/419 |

FOREIGN PATENT DOCUMENTS

| | | |
|---|---|---|
| JP | 2003-085588 A | 3/2003 |
| JP | 2008-084338 A | 4/2008 |
| JP | 2009-104570 A | 5/2009 |
| JP | 2013-034084 A | 2/2013 |
| JP | 2013-085133 A | 5/2013 |
| JP | 2013-201697 A | 10/2013 |

(Continued)

OTHER PUBLICATIONS

International Search Report for PCT/JP2016/065161, dated Jun. 28, 2016.

*Primary Examiner* — Andrew G Yang
(74) *Attorney, Agent, or Firm* — Merchant & Gould P.C.

(57) ABSTRACT

An information processing apparatus acquires a 2D image as a definition target of depth information, and accepts, for the acquired 2D image, an input of point information for designating two points on the image and an input of line segment information indicating a first line segment as a standard of a depth. The apparatus sets, for a point on a second line segment connecting the two points on the 2D image indicated by the point information, depth information based on the first line segment indicated by the line segment information.

12 Claims, 10 Drawing Sheets

(56) References Cited

FOREIGN PATENT DOCUMENTS

| JP | 2014-075726 A | 4/2014 |
| JP | 2014-192794 A | 10/2014 |

* cited by examiner

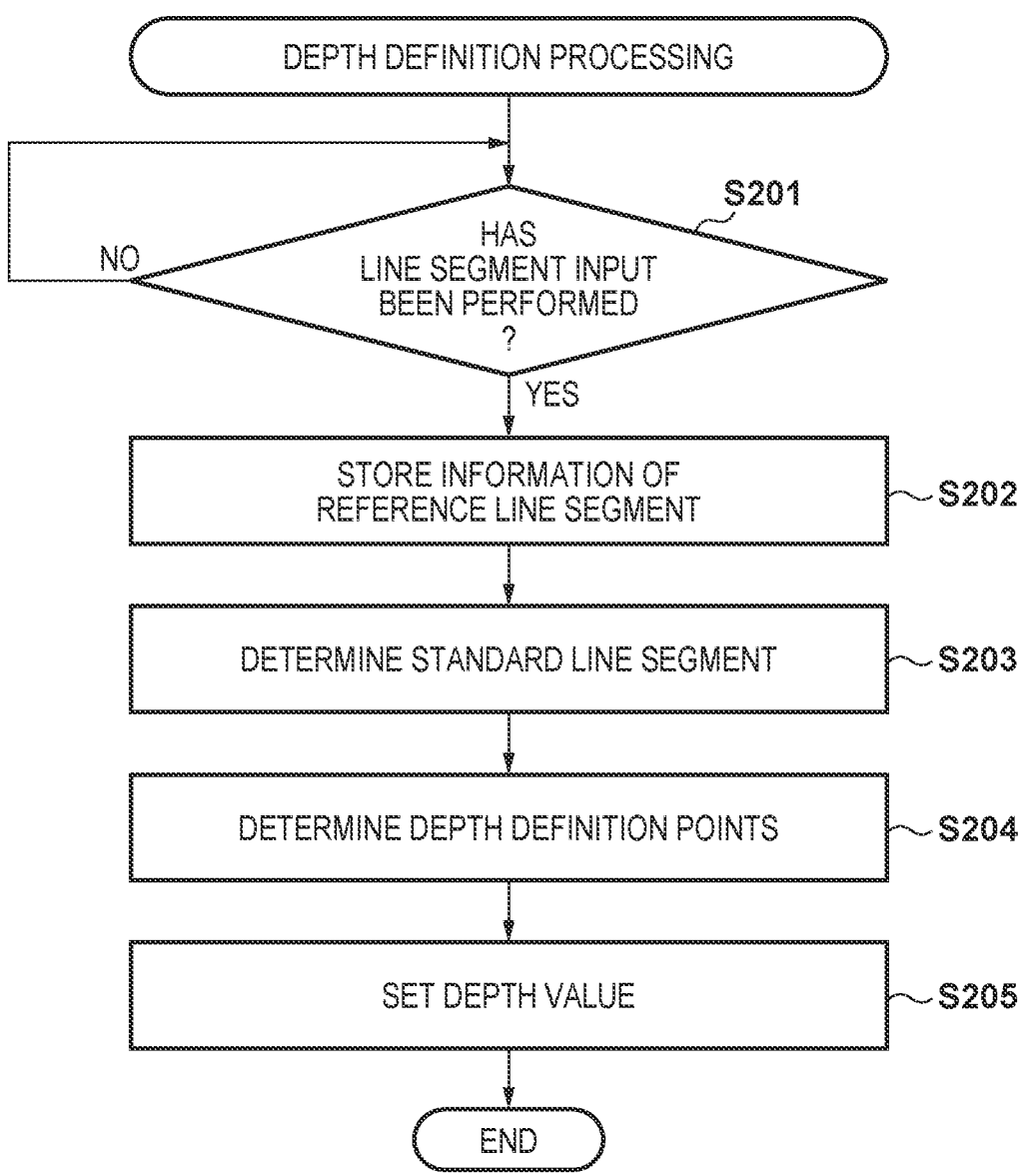

F I G. 4A
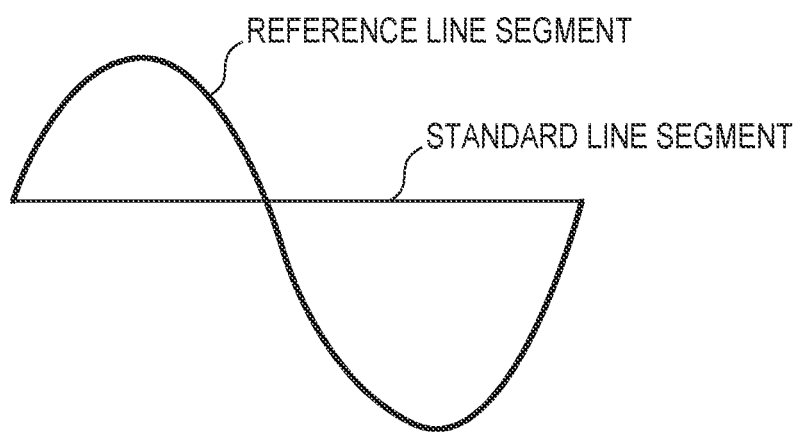
F I G. 4B
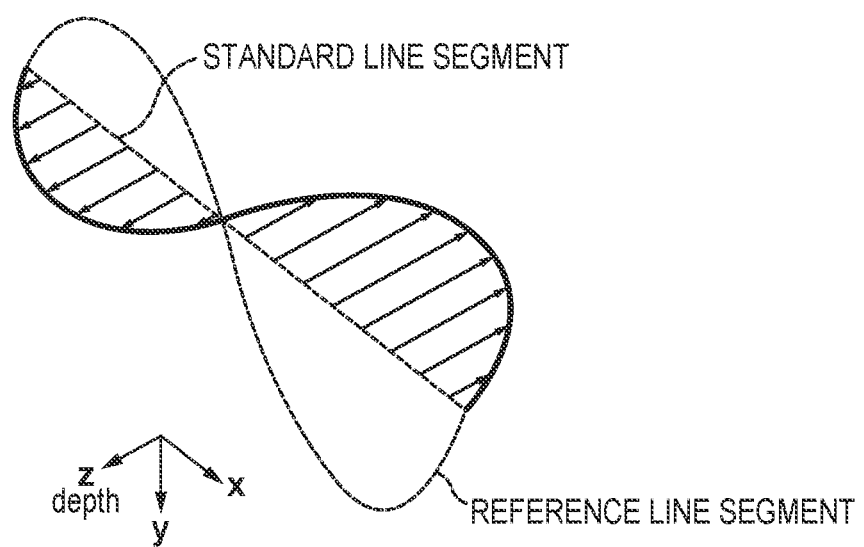

F I G. 10A
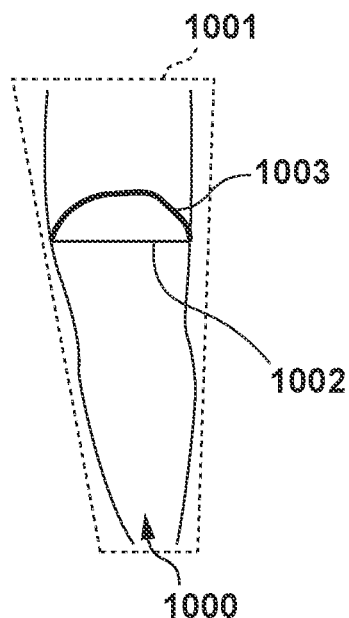
F I G. 10B
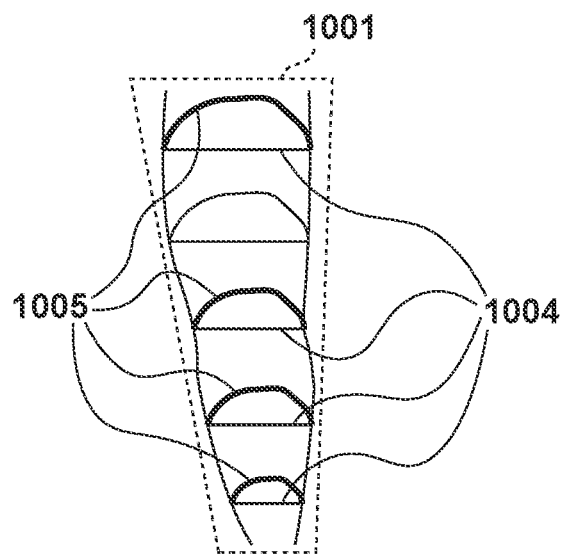

RECORDING MEDIUM, INFORMATION PROCESSING APPARATUS, AND DEPTH DEFINITION METHOD

This application is a continuation of International Patent Application No. PCT/JP2016/065161 filed on May 23, 2016, and claims priority to Japanese Patent Application No. 2015-133122 filed on Jul. 1, 2015, the entire content of both of which is incorporated herein by reference.

BACKGROUND OF THE INVENTION

Field of the Invention

The present invention relates to a recording medium, an information processing apparatus, and a depth definition method and, more particularly, to a technique of defining an undulation in a depth direction for a 2D image.

Background Art

In recent years, in the technical field of computer graphics represented by an electronic game, rendering representation using a 3D model has become the mainstream. This is because when, for example, rendering frames at a plurality of successive points while moving the same character and the background like animation, the time taken to perform processing such as repetitive rendering processing or lighting calculation processing can be reduced. Especially for an interactive content in which the action of a character and the like change in real time in response to an operation input in an electronic game or the like, it is possible to cope with rendering representations from various viewpoint positions or directions by preparing in advance a 3D model, animation data, and the like. In general, in such 3D graphics, a 3D model is constructed based on a plurality of 2D images (cuts) prepared by a designer or the like, and texture is applied to the model, thereby performing rendering.

On the other hand, in 3D graphics rendered by applying texture, an impression different from the initial cut prepared by the designer or the like may be given. The 3D graphics is basically a technique for "correctly" rendering a 3D model applied with texture with respect to a specific viewpoint, and it is thus difficult to reproduce a representation of an effective "appearance" in a specific line-of-sight direction, unlike a cut rendered by a 2D image. Therefore, a game content in which a 2D image is mainly used in a game screen by prioritizing the appeal of the representation unique to the 2D image has been supported to some extent.

PTL 1 discloses a rendering technique capable of representing (three-dimensionally representing) 3D animation while maintaining the atmosphere and appeal of a 2D image rendered by a designer or the like. More specifically, in PTL 1, after dividing a 2D image into parts such as hair, eyebrows, eyes, and a contour (face), a standard curved surface is simply assigned to the part of the contour in accordance with the appearance of the 2D image. By performing geometric deformation and movement for the 2D images of other parts in accordance with the spherical surface of the contour rotated in correspondence with the direction of the face to be represented, and allowing application of various adjustment operations, a representation desired by the designer from a different direction is implemented without damaging the impression of the original 2D image. That is, unlike a method of performing rendering by simply applying texture, the method described in PTL 1 adopts a method of deforming a 2D image to implement a representation desired by the designer.

CITATION LIST

Patent Literature

PTL 1: Japanese Patent Laid-Open No. 2009-104570
PTL 2: Japanese Patent Laid-Open No. 2003-085588

SUMMARY OF THE INVENTION

Technical Problem

Various parts of a 2D image presenting a 2D representation from a predetermined direction are deformed in accordance with the translation and rotation of a standard part, as in PTL 1. However, it is necessary to construct a curved surface to be defined for the standard part. This operation is the same as the operation of constructing a 3D model in the 3D graphics. To utilize the appeal of a 2D representation, it is necessary to define a spherical surface for each cut of a 2D image, that is, depth direction information for each 2D image. That is, in the case of the 3D graphics, it is possible to generate representations from various directions based on one 3D model. However, when generating a 3D representation from a 2D image indicating a preferable representation for each of discretely defined directions, a contour shape and the like are different, and it is thus not preferable to use a common 3D model.

To the contrary, PTL 2 discloses a modeling method of simply defining a 3D shape for a portrait in a 2D image. However, the modeling method described in PTL 2 prepares in advance 3D standard shape data of a portrait, and deforms the data in accordance with the image. As a result, a 3D shape desired by a designer may not always be obtained. Furthermore, especially, the method described in PTL 2 is a method of defining a 3D shape for a photographed image. Therefore, since the positions and sizes of eyes in a face may be different from those of an actual portrait, it is impossible to readily apply the method to a character image like a picture rendered by the designer or the like.

In 3D modeling, to combine basic graphics such as a sphere and rectangular parallelepiped, and represent a 3D structure, it is necessary to adjust an undulation by rotating the graphics in various directions. To use such modeling tool, technical knowledge is necessary. Therefore, a 2D image designer and a 3D modeling designer are often different in actual development, and an undulation and contour desired by the 2D image designer may not be always represented.

The present invention has been made in consideration of the above problems, and provides a non-transitory recording medium recording a program of intuitively defining, for a 2D image, information of an undulation in the depth direction of the image, an information processing apparatus, and a depth definition method.

Solution to Problem

The present invention in its first aspect provides a non-transitory computer-readable recording medium recording a program for causing a computer to execute: processing of acquiring a 2D image as a definition target of depth information; processing of accepting, for the acquired 2D image, an input of point information for designating two points on the image and an input of line segment information indicating a first line segment as a standard of a depth; and processing of setting, for a point on a second line segment connecting the two points on the 2D image indicated by the point information, depth information based on the first line segment indicated by the line segment information.

The present invention in its second aspect provides an information processing apparatus comprising: an acquirer which is able to acquire a 2D image as a definition target of depth information; an inputter which is able to accept, for the 2D image acquired by the acquirer, an input of point information for designating two points on the image and an input of line segment information indicating a first line segment as a standard of a depth; and a setter which is able to set, for a point on a second line segment connecting the two points on the 2D image indicated by the point information, depth information based on the first line segment indicated by the line segment information.

The present invention in its third aspect provides a depth definition method comprising: an acquisition step of acquiring a 2D image as a definition target of depth information; an input step of accepting, for the 2D image acquired in the acquisition step, an input of point information for designating two points on the image and an input of line segment information indicating a first line segment as a standard of a depth; and a setting step of setting, for a point on a second line segment connecting the two points on the 2D image indicated by the point information, depth information based on the first line segment indicated by the line segment information.

Advantageous Effects of Invention

According to the present invention, this arrangement makes it possible to simply define, for a 2D image, information of an undulation in the depth direction of the image.

Other features and advantages of the present invention will be apparent from the following description taken in conjunction with the accompanying drawings. Note that the same reference numerals denote the same or like components throughout the accompanying drawings.

BRIEF DESCRIPTION OF THE DRAWINGS

The accompanying drawings, which are incorporated in and constitute a part of the specification, illustrate exemplary embodiments of the invention and, together with the description, serve to explain the principles of the present invention.

FIG. 2 is a flowchart exemplifying depth definition processing executed by the PC 100 according to the first embodiment of the present invention;

FIGS. 4A and 4B are views showing an example of a method of determining the positive/negative of depth information according to the embodiment of the present invention;

FIGS. 10A and 10B are views for explaining a method of defining depth information based on estimation according to Modification 4 of the present invention.

DESCRIPTION OF THE EMBODIMENTS

First Embodiment

An exemplary embodiment of the present invention will be described in detail below with reference to the accompanying drawings. Note that an embodiment to be described below will explain an example in which the present invention is applied to a PC, as an example of an information processing apparatus, capable of executing a program of setting depth information of a predetermined character for a 2D image associated with the character. However, the present invention is not limited to the character, and is applicable to an arbitrary apparatus capable of setting depth information for planar information represented by a 2D image.

<<Arrangement of PC 100>>

Figure 1:
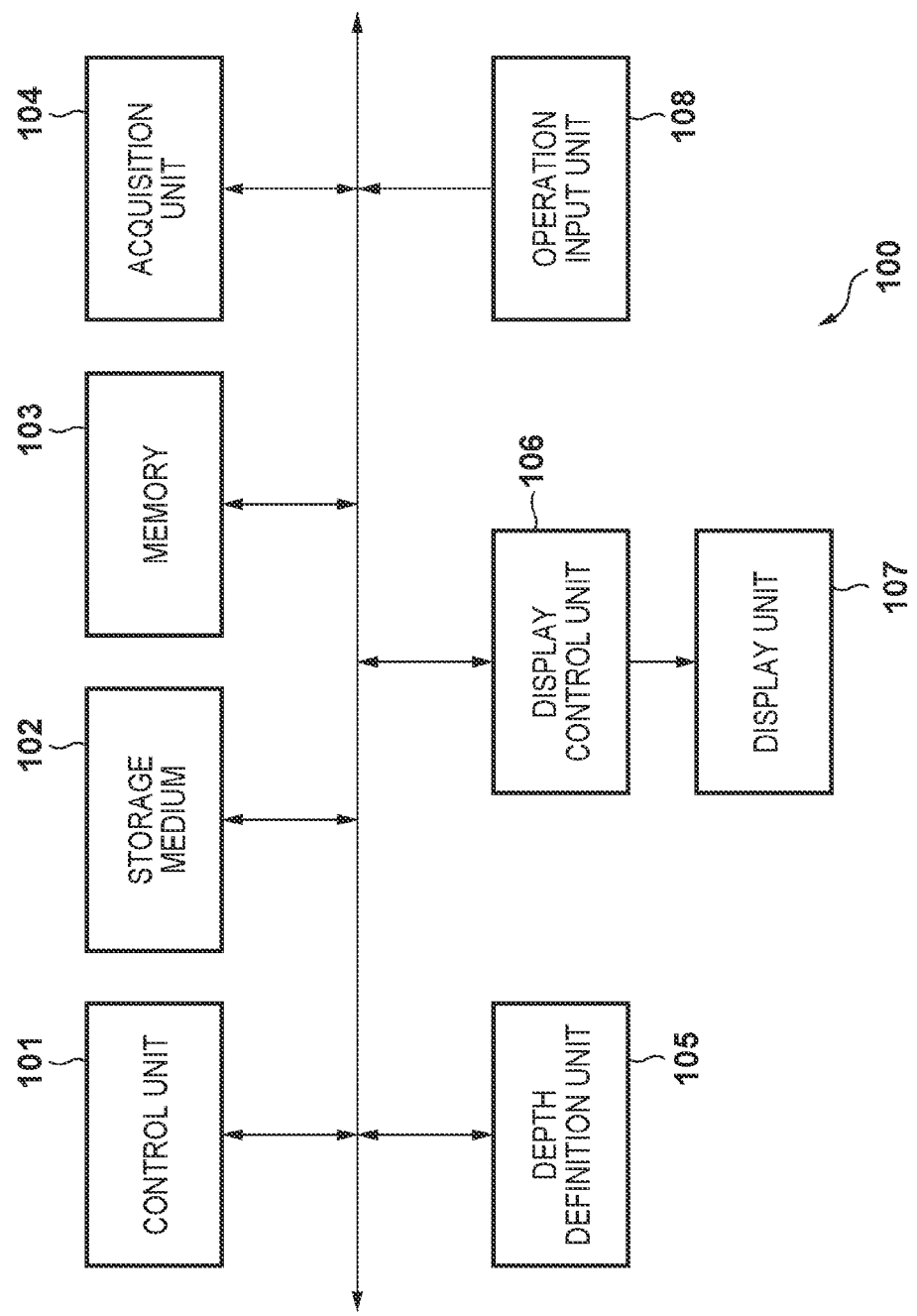
FIG. 1 is a block diagram showing the functional arrangement of a PC 100 according to an embodiment of the present invention.

FIG. 1 is a block diagram showing the functional arrangement of the PC 100 according to the embodiment of the present invention.

A control unit 101 is, for example, a control device such as a CPU, and controls the actions of the respective blocks of the PC 100. More specifically, the control unit 101 reads out a program related to an operating system stored in a storage medium 102, a program related to a depth definition application (to be described later), or the like, loads it into a memory 103, and executes it, thereby controlling the actions of the respective blocks.

The storage medium 102 is, for example, a nonvolatile memory such as a rewritable ROM, or a storage device such as an HDD detachably connected to the PC 100. The storage medium 102 may include a recording medium such as a disk recording a game program accessible via a predetermined readable/writable interface such as an optical drive. The storage medium 102 stores information of parameters and the like necessary for the actions of the respective blocks, various kinds of data used to generate game images, and the like in addition to the above-described programs.

The memory 103 may be, for example, a volatile memory such as a RAM. The memory 103 is used not only as a loading area for loading the program and the like read out from the storage medium 102 but also as a storage area for storing intermediate data and the like output in the actions of the respective blocks.

An acquisition unit 104 acquires a 2D image as a depth information definition target. The acquisition unit 104 reads out, from the storage medium 102, a 2D image selected based on a user operation input or reads out corresponding image data from an external apparatus connected to the PC 100, and loads the readout image or data into the memory 103.

A depth definition unit 105 defines, for the 2D image as the depth information definition target, depth information corresponding to the 2D image based on an operation input done by the user. Definition of depth information may be implemented by, for example, setting a depth value for each pixel of the 2D image, or forming a 3D model or depth map having a predetermined resolution.

A display control unit 106 may include, for example, a GPU, and controls generation and update of a screen displayed on a display region of a display unit 107. In this embodiment, if a 2D image as a depth target definition target is designated, the display control unit 106 forms screen data including at least part of the image, and transmits it to the display unit 107 to display it. The display unit 107 is, for example, a display device such as an LCD. In this embodiment, the display unit 107 will be described as a component of the PC 100. The present invention, however, is not limited to this. The display unit 107 need not be formed to have the same housing as that of the PC 100, and may be an external display device detachably attached to the PC 100.

An operation input unit 108 is, for example, a user interface of the PC 100, such as a mouse, keyboard, or pen tablet. Upon detecting an operation input performed via the various interfaces, the operation input unit 108 outputs a control signal corresponding to the operation input to the control unit 101. Alternatively, the operation input unit 108 notifies the control unit 101 of the occurrence of an event corresponding to the operation input.

<<Depth Definition Processing>>

Depth definition processing of defining depth information for a 2D image, which is executed by the PC 100 with the above arrangement according to this embodiment, will be described in detail with reference to a flowchart shown in FIG. 2. The processing corresponding to this flowchart can be implemented when the control unit 101 reads out, for example, a corresponding processing program stored in the storage medium 102, loads it into the memory 103, and executes it. Note that this depth definition processing will be described as processing which starts when, for example, a 2D image (target image) as a depth information definition target is acquired using the acquisition unit 104 and a depth setting function is selected after the start of an image processing application having the depth setting function.

In step S201, the control unit 101 determines whether a line segment input has been performed for the target image. The line segment input is determined based on an operation input detected by the operation input unit 108. If, for example, an operation input is accepted by a pen tablet or mouse, information of a locus defined by connecting successive point (coordinate) inputs is included. The line segment input need not be based on a locus, as a matter of course. For example, a plurality of discrete point inputs and directions, which define anchor points and direction lines or a knot vector and control points, may be included (vector data and the like). A line segment defined by the line segment input is preferably a curve (including a polygonal line) to express a wavy shape. However, even if the line segment is a straight line, it can be processed. If it is determined that the line segment input has been performed, the control unit 101 shifts the process to step S202; otherwise, the control unit 101 repeats the processing in this step.

In step S202, the control unit 101 stores information of the input line segment (reference line segment) in, for example, the memory 103. The stored line segment information may be formed by coordinates (endpoint information) of start and end points of the line segment, and the coordinate groups of points existing at a predetermined interval on the line segment or points defined by dividing the line segment into a predetermined number of parts. Alternatively, the stored line segment information may be formed by information of a function of performing polynomial approximation for the line segment and endpoint information. In the former case, assume that it is possible to reproduce the reference line segment by interpolating the coordinate group.

In step S203, under the control of the control unit 101, the depth definition unit 105 determines a standard line segment on the depth definition target image. In this embodiment, based on the endpoint information of the reference line segment, the depth definition unit 105 determines, as a standard line segment, a straight line defined by connecting the endpoints of the reference line segment.

In step S204, the depth definition unit 105 determines, for the standard line segment, points (depth definition points) at each of which depth information is defined. Note that in this embodiment, depth definition points are determined to exist at a predetermined interval with respect to positions on the line segment except for the endpoints of the standard line segment. The depth definition points may include the endpoints. However, these endpoints coincide with the endpoints of the reference line segment, and depth values are 0 in step S205 (to be described later) in the depth definition processing according to this embodiment. Therefore, in terms of simplifying the processing, the endpoints are excluded from the depth definition points in the depth definition processing according to this embodiment.

In this embodiment, points existing at a predetermined interval on the standard line segment are set as depth definition points. However, an arbitrary number of depth definition points may be determined at arbitrary positions on the standard line segment, for example, depth definition points may be determined for the respective pixels of the 2D image, which exist on the standard line segment. Alternatively, depth definition points may be determined in correspondence with the resolution of the 3D model or depth map defined based on the depth information.

In step S205, the depth definition unit 105 specifies a corresponding point on the reference line segment, which corresponds to each depth definition point determined in step S204, sets the depth value of the depth definition point in accordance with the distance between the depth definition point and the corresponding point, and stores the depth value. In this embodiment, the depth value is stored by updating the depth value at corresponding coordinates in the depth map associated with the target image. As described above, however, the structure of the depth information is not limited to this.

Figure 3A:
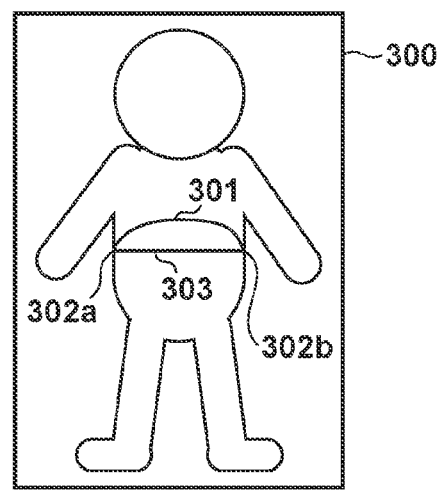
FIGS. 3A, 3B, and 3C are views for explaining a method of defining depth information according to the embodiment of the present invention.
Figure 3B:
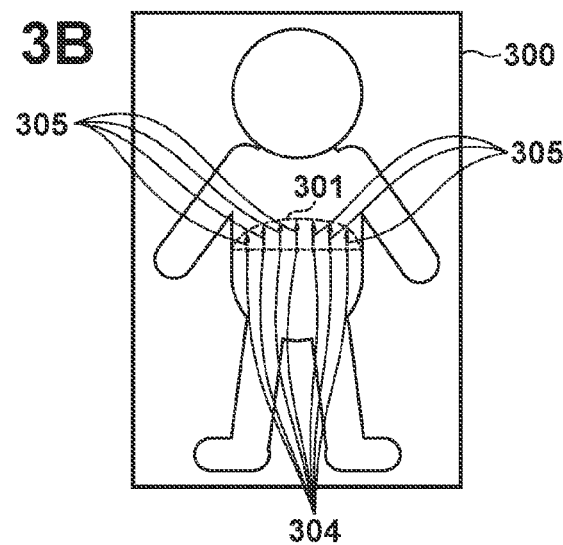
Figure 3C:
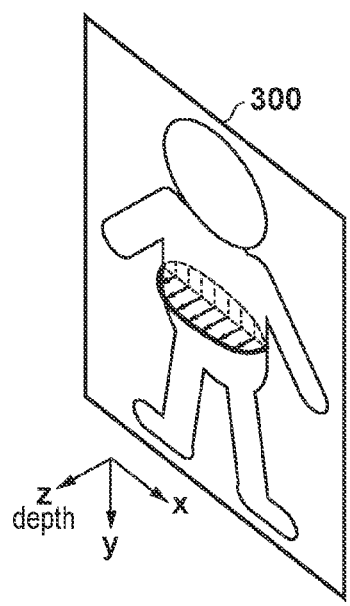

Assume that the corresponding point of each depth definition point on the reference line segment is the intersecting point of the reference line segment and a straight line which passes through the depth definition point and is orthogonal to the standard line segment within a target image plane. That is, as shown in FIG. 3A, a reference line segment 301 input for a target image 300 defines depth information for a standard line segment 303 connecting endpoints 302*a* and 302*b* of the reference line segment 301. At this time, the depth values of respective depth definition points 304 on the standard line segment 303 are set in accordance with the distances from the intersecting points between the reference line segment 301 and orthogonal lines 305 which are parallel straight lines passing through the respective depth definition points and orthogonal to the standard line segment 303, as shown in FIG. 3B. Therefore, an undulation in the depth direction, as shown in FIG. 3C, can be defined for the position of the standard line segment 303 of the target image 300 (FIG. 3C shows merely an example to understand the relationship between the 2D image and the undulation).

A depth value may be the distance between each depth definition point and its corresponding point, or a value obtained by multiplying the distance by a predetermined coefficient. That is, when a corresponding point of a depth definition point $P(x_t, y_t)$ on the standard line segment is represented by $R(x_t, y_t)$, a depth value $D(x_t, y_t)$ set for the point P may be calculated using a coefficient k by:

$$D(x_t,y_t)=k\times|P(x_t,y_t)-R(x_t,y_t)|$$

The depth value defined by the depth information is not limited to a value indicating a bulge (bump) toward the front side of the screen on which the target image is displayed, and may be a value indicating a recess (a depression or the like) toward the far side of the screen. The positive/negative (0 for a display surface) of the depth value may be determined by presetting a line segment input of defining a depth in the positive or negative direction or may be determined in accordance with whether the above-described coefficient is a positive or negative value. Alternatively, without requiring any specific input when instructing the positive/negative of the depth direction, the positive/negative of the depth direction may be determined, as shown in FIG. 4B, depending on a direction in which a corresponding point exists, by setting the standard line segment as a boundary, as shown in FIG. 4A.

As described above, the depth definition processing according to this embodiment makes it possible to intuitively define depth information desired by the user by performing a simple operation input for a 2D image.

Second Embodiment

Figure 5A:
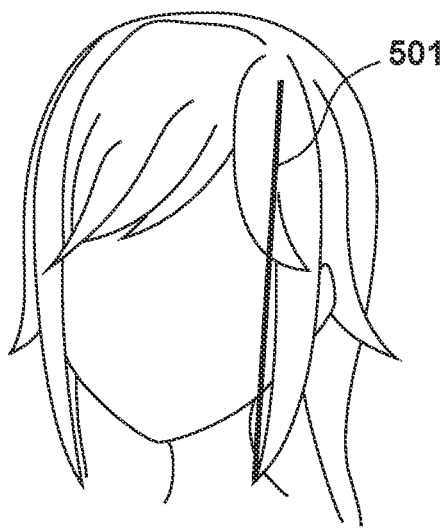
FIGS. 5A and 5B are views for explaining a method of defining depth information according to the second embodiment of the present invention.
Figure 5B:
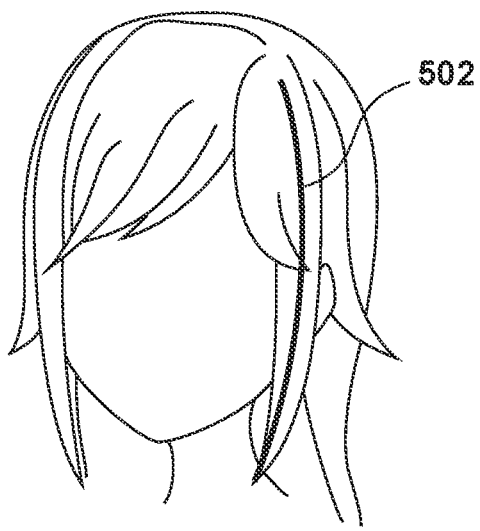

The above embodiment has been explained by assuming that a straight line connecting the endpoints of a reference line segment input within a region of a target image is set as a standard line segment, and depth information corresponding to the reference line segment is defined for each point on the line segment. However, a 2D image is not limited to, for example, an image rendered from a direction in which a character faces, as described with reference to FIGS. 3A to 3C. That is, since the composition and perspective of an image rendered in a 2D image are determined by a designer, if depth information is defined for a straight line in the target image, as in the case of the facing direction, it may be impossible to intuitively define depth information desired by the designer. For example, when defining depth information from the root to the end of a hairstyle with hair bundle feeling and a "wave" shown in FIG. 5A, it is possible to intuitively set a desired depth representation by defining depth information by setting, as a standard line segment, a curve 502 conforming to the wave, as shown in FIG. 5B, as compared with a case in which depth information is defined by setting a straight line 501 as a standard line segment.

In a PC 100 according to this embodiment, a method of defining depth information by accepting an input of a standard line segment separately from a reference line segment in order to improve the convenience related to such depth definition will be described. Note that the following depth definition processing will be described below as processing of accepting a standard line segment input and a reference line segment input in the order named in consideration of a procedure preferable for the user. However, it will be readily understood that the input order of the respective line segments need not be limited to this. In addition, the standard line segment and the reference line segment may be discriminated depending on whether a stroke is the first or second stroke of a 2-stroke locus input or may be discriminated by another operation input of switching the role of an input line segment.

<<Depth Definition Processing>>

Figure 6:
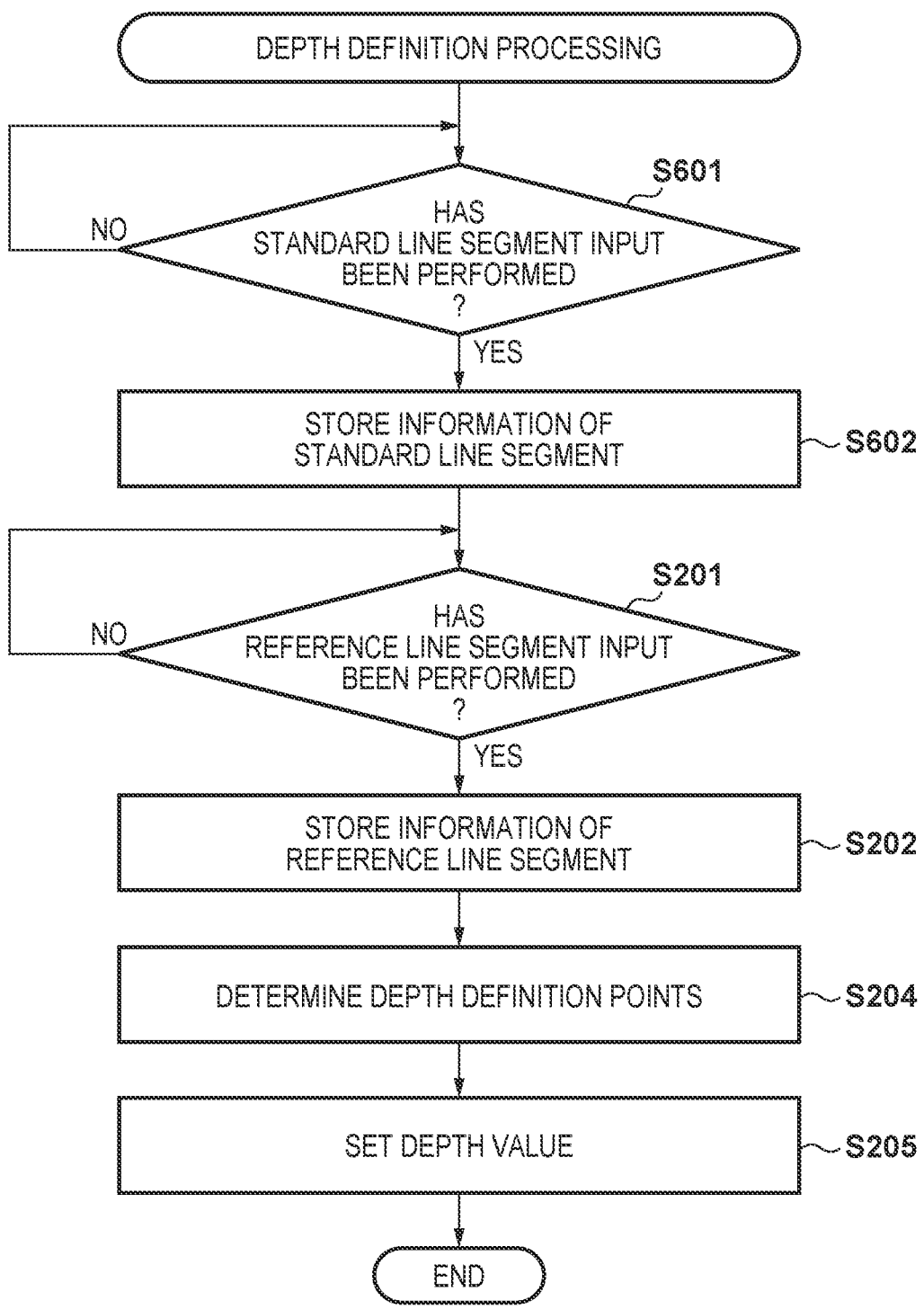
FIG. 6 is a flowchart exemplifying depth definition processing executed by a PC 100 according to the second embodiment of the present invention.

The depth definition processing according to this embodiment will be described in detail with reference to a flowchart shown in FIG. 6. Note that in the depth definition processing according to this embodiment, the same reference symbols as in the first embodiment denote steps of performing the same processes and a description thereof will be omitted. Only characteristic processes in this embodiment will be described below.

In step S601, a control unit 101 determines whether a line segment input related to a standard line segment has been performed for a target image. If it is determined that a line segment input related to a standard line segment has been performed, the control unit 101 shifts the process to step S602; otherwise, the control unit 101 repeats the processing in this step.

In step S602, the control unit 101 stores information of the input reference line segment, and shifts the process to step S201. The above-described first embodiment has explained that the endpoint information used to define the standard line segment is output based on the line segment input related to the reference line segment. In the depth definition processing according to this embodiment, however, since the standard line segment input is accepted, endpoint information is determined based on the start and end points of the standard line segment. The depth definition processing according to this embodiment assumes that the reference line segment accepted in step S201 is defined by a line segment input from the end or start point of the input standard line segment to the other endpoint. That is, if a standard line segment and a reference line segment are input by successively inputting two strokes, the user can start a line segment input related to the reference line segment from the end point of the standard line segment, and complete the line segment input related to the reference line segment by leading the input position to the start point of the standard line segment.

Note that in the depth definition processing according to this embodiment, the reference line segment input is accepted first, as described above, and thus the processes in step S201 and subsequent steps except for the processing in step S203 of the depth definition processing according to the first embodiment are executed.

As described above, the depth definition processing according to this embodiment makes it possible to define depth information for a standard line segment having an arbitrary shape defined on a 2D image, thereby more simply defining depth information desired by the user.

[Modification 1]

The second embodiment has been explained by assuming that the corresponding point of each depth definition point is determined based on a straight line which passes through the depth definition point and is orthogonal to the standard line segment, similarly to the first embodiment. However, for example, if the standard line segment is a curve, corresponding points are discrete on the reference line segment, and some designers may have an impression of not being intuitive. If, for example, the standard line segment is a polygonal line, it may be impossible to define the concept of orthogonality unless a rule is set at an inflection point.

Figure 7A:
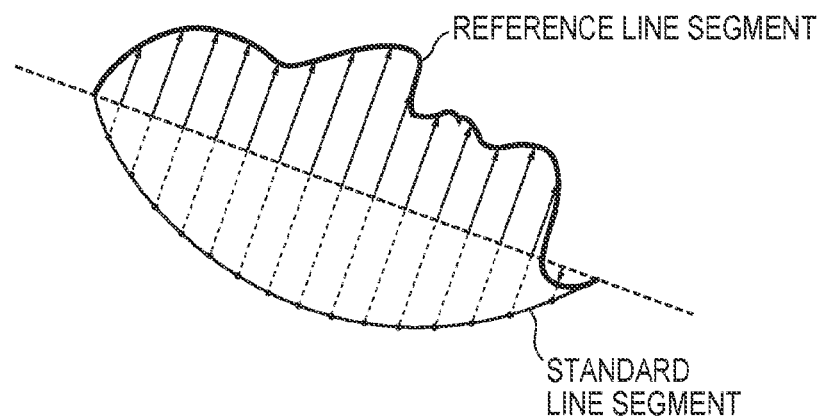
FIG. 7A is a view exemplifying a straight line defined for a corresponding point search according to Modification 1 of the present invention.

Therefore, in this modification, when determining the corresponding point of each depth definition point, a straight line which is orthogonal to a straight line defined by endpoint information as in the first embodiment and passes through the depth definition point is used, instead of the standard line segment, and the intersecting point of the straight line and the reference line segment is set as the corresponding point, as shown in FIG. 7A. This determines the corresponding points by the orthogonal lines parallel to each other and formed by the endpoint information regardless of the shape of the standard line segment, thereby making it possible to present, to the user, more intuitive operation feeling in defining depth information.

[Modification 2]

Figure 7B:
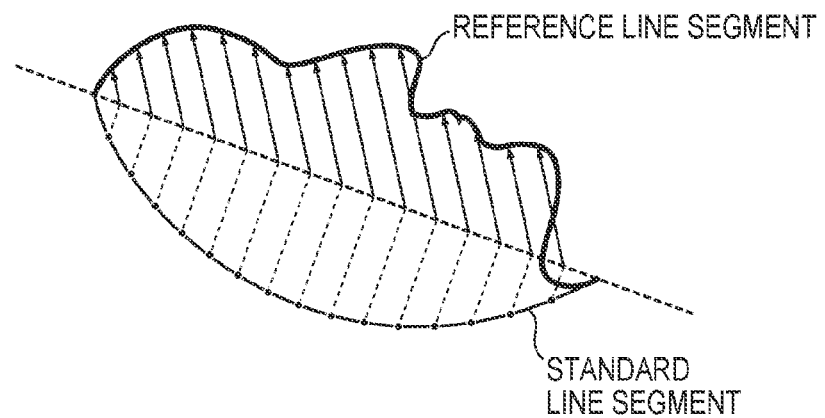
FIG. 7B is a view exemplifying a straight line defined for a corresponding point search according to Modification 2 of the present invention.

The first and second embodiments and Modification 1 have been explained by assuming that the corresponding points of the depth definition points are determined based on the line segments orthogonal to the straight line defined based on the standard line segment or the endpoint information. However, straight lines used to search for corresponding points need not be orthogonal to the standard line segment or the like. For example, an angle formed with the standard line segment or the like can be preset, and a search for corresponding points may be performed with respect to straight lines defined based on the angle, as shown in FIG. 7B.

[Modification 3]

Note that the reference line segment and the standard line segment used to define depth information may be those for which pieces of information are held in, for example, a storage medium 102 in association with a target image so as to refer to the reference line segment and the standard line segment even after defining the depth information. These line segments need not be superimposed and displayed all the time during display of the target image associated with the depth definition processing, and may normally undergo display control in an invisible state so as to be set in a visible state by, for example, an operation input such as a mouseover operation to a corresponding region.

Figure 8A:
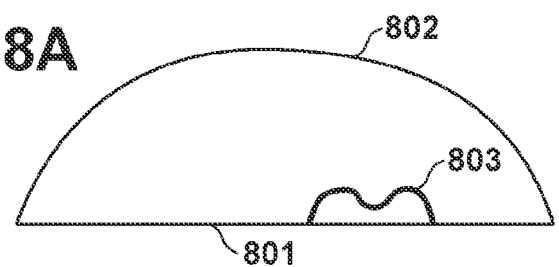
FIGS. 8A and 8B are views for explaining a mode of re-editing of depth information according to Modification 3 of the present invention.
Figure 8B:
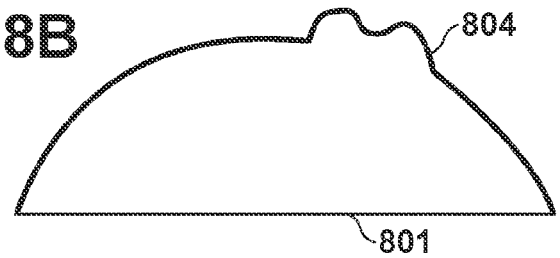

Furthermore, the reference line segment and standard line segment related to the already defined depth information may be configured to be re-edited. In this case, it may be possible to define the line segments again, move specific points and the like (depth definition points, corresponding points, endpoints, points and a vector used to define each line segment, and the like), change the coefficient associated with depth value setting, change the positive/negative of the depth direction, and change the tilt angles of the line segments related to a search for corresponding points. As shown in FIG. 8A, the addition/subtraction operation of the depth value may be performed in accordance with a reference line segment 803 by additionally inputting the reference line segment 803 onto a standard line segment 801 for which depth information has already been defined based on a reference line segment 802. The addition/subtraction operation may set, for the reference line segment 802, depth values based on a new reference line segment 804 in consideration of the reference line segment 803, as shown in FIG. 8B (FIG. 8B shows the addition operation).

Figure 9A:
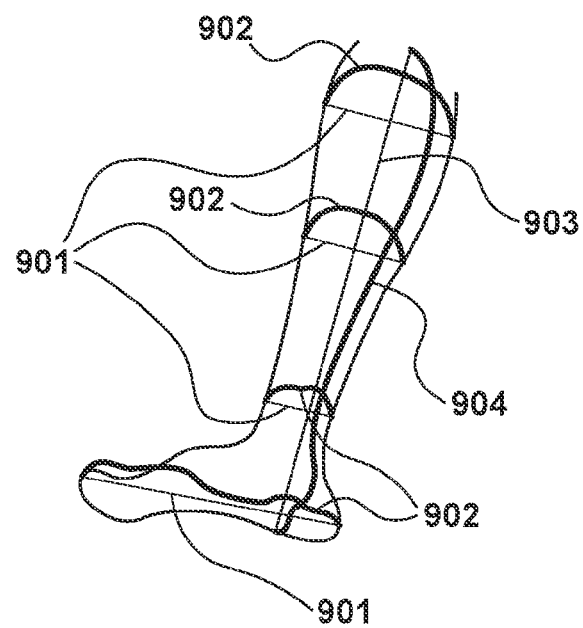
FIGS. 9A, 9B, and 9C are views for explaining a mode of matching depth values in re-editing of the depth information according to Modification 3 of the present invention.
Figure 9B:
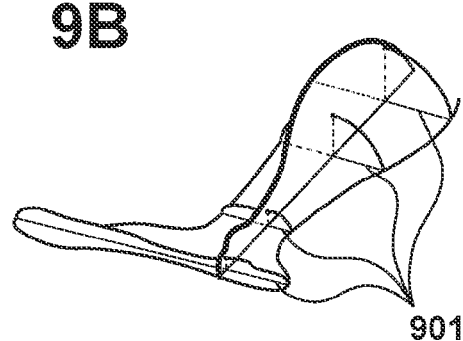
Figure 9C:
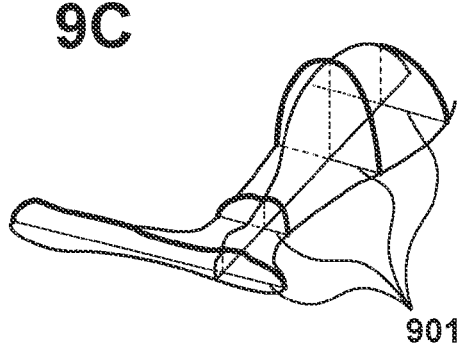

Depth information can be defined by defining standard line segments in various directions. If, however, depth information is defined for a standard line segment intersecting a standard line segment for which depth information has already been defined, processing other than the addition/subtraction operation of the depth value may be performed. For example, the application ratio (the above-described coefficient) of the reference line segment related to depth value setting of at least one of the standard components is changed so that the depth values of the line segments match each other. More specifically, consider a case in which depth information is defined based on a standard line segment 903 and a reference line segment 904 if pieces of depth information have already been defined based on reference line segments 902 for a plurality of standard line segments 901, as shown in FIG. 9A. For example, with respect to a depth definition point located at the intersecting point of the standard line segment 903 and each standard line segment 901, a depth value determined based on a corresponding point on the reference line segment 904 may be preferentially set. In this case, mismatching of the depth values may occur for the depth definition point at the same position on each standard line segment 901, as shown in FIG. 9B. Thus, the coefficient to be used for depth value setting for the standard line segment 901 is changed to adjust depth information, as shown in FIG. 9C. Note that a standard line segment whose depth value is prioritized may be selectable by each user. This prioritization unit may be designated for each standard line segment or each depth definition point. This can define a shape having a planar end portion, that is, a shape having a depth value other than 0 even at an endpoint position on a specific standard line segment.

In defining or re-editing depth information, as described above, a display control unit 106 may display, together with the target image, a 3D shape based on the depth information defined by the depth definition processing so as to confirm whether a depth representation desired by a designer is obtained. Similarly to a normal 3D model viewer, the 3D shape may be configured to undergo a translation or rotation operation in response to an operation input to the display interface of the shape.

[Modification 4]

In the technique described in PTL 1, to perform 3D animation representation, a 2D image in which a character and the like are rendered is divided for each portion, and the divided portions are defined as parts. In this case, if depth information is defined for one or more standard line segments, it is possible to estimate a shape such as a semi-cylindrical shape or semi-ellipsoid from the shape of the region of each part. Based on one or more standard line segments for which depth information have been defined for the region, it is possible to estimate a standard line segment and reference line segment considered to be defined at another position in the region, and give depth information.

More specifically, for example, if a region 1001 is set of a part having a shape (an arm 1000) shown in FIG. 10A, depth information is assumed to be defined for a standard line segment 1002 by a reference line segment 1003. In this case, the region 1001 has a trapezoidal shape in which the width in the horizontal direction decreases downward (downward in the vertical direction) in FIG. 10A. Thus, it can be estimated to be preferable that depth information associated with a parallel standard line segment whose width is increased/decreased at another position in the vertical direction is defined by defining the depth information associated with the standard line segment 1002. Therefore, as shown in FIG. 10B, even if no operation input is performed by the user, a plurality of standard line segments 1004 and reference line segments 1005 obtained by performing homologous deformation for the reference line segment 1003 in accordance with respective widths are defined at a predetermined interval in the vertical direction. For each standard line segment 1004, depth information is defined based on the corresponding reference line segment 1005.

This can simplify a depth definition operation by the user, thereby improving the convenience. Note that in the example shown in FIGS. 10A and 10B, the region 1001 has a trapezoidal shape indicating the longitudinal direction in the vertical direction, and thus the standard line segments 1004 determined based on estimation are parallel to the standard line segment 1002. The present invention, however, is not limited to this. If the region has a curved shape, the directions of the standard line segments determined based on estimation may be determined in accordance with the angles formed by a curve determined in accordance with the curvature of the region and the standard line segments for each of which the depth information has been defined. The depth definition unit 105 may define standard line segments determined based on estimation by defining, in the region, a plurality of straight lines radially extending from the central point for determining the curvature of the region, and then rotating the straight lines in accordance with the angles.

Definition (estimation) of depth information which requires no operation input based on such shape recognition has been explained by assuming a case in which the shape of the region such as a part can be clearly grasped based on transparency, layer information, and the like set in the image. The present invention, however, need not be limited to this. For example, shape recognition or estimation may be performed by acquiring, by image processing, information of a boundary portion in the image and color information such as a contrast difference, and whether depth information is defined without requiring any operation input may be determined. Shape recognition need not be performed for one image such as a part divided in advance, as a matter of course. If a partial shape can be recognized for a region in the image, processing may be performed by assuming that there are a plurality of shapes for one image.

Third Embodiment

In the above-described embodiments and modifications, the endpoints of the standard line segment are basically restricted to have the depth value equal to that of the display surface of the target image. That is, since depth information is defined by an operation input in which the endpoints of the reference line segment coincide with those of the standard line segment, even if the endpoints of the standard line segment are set as depth definition points, corresponding points on the reference line segment coincide with the depth definition points, and thus the depth values become 0.

Figure 11A:
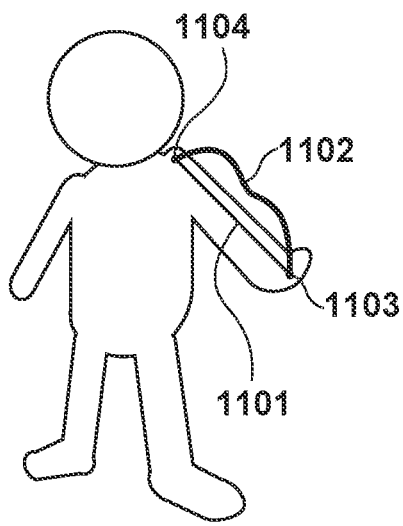
FIGS. 11A and 11B are views for explaining a method of defining depth information without considering the display region surface of a target image according to the third embodiment of the present invention.

On the other hand, in a character image or the like, for example, there exists an object rendered in perspective such that the end portion (a fingertip or the like) of a part exists on the front side (or far side) of the display surface of the 2D image, as shown in FIG. 11A, as a matter of course. In this case, for example, even if a reference line segment 1102 is defined for a standard line segment 1101, a point 1103 corresponding to a fingertip has a depth value of 0, and thus a depth representation desired by a designer is not obtained. Therefore, this embodiment adopts an arrangement in which attribute information indicating whether to restrict the depth value to the display surface of the target image can be added to at least one of endpoints indicated by endpoint information. As shown in, for example, FIG. 11B, an arrangement may be adopted in which attribute information for releasing the restriction of the depth value for the point 1103 of the endpoints of the standard line segment 1101 is added by inputting the standard line segment 1101 as a locus from the point 1103 to a point 1104, and then inputting a reference line segment 1106 as a locus from the point 1104 to a point 1105 at a position away from the point 1103. With this arrangement, a depth definition unit 105 sets, as the point 1105, a point corresponding to the depth definition point 1103 in determination of a point on the reference line segment 1106 corresponding to the depth definition point on the standard line segment 1101, and determines a depth value to be set for the point 1103 in accordance with the distance between the points 1103 and 1105. In determining a corresponding point for another depth definition point on the standard line segment 1101, no intersecting point of the reference line segment 1106 and a line segment passing through each depth definition point and orthogonal to the standard line segment 1101 may exist. Thus, the depth definition unit 105 determines, for example, a straight line used to search for a corresponding point to be parallel to a straight line connecting the points 1105 and 1103.

Figure 11B:
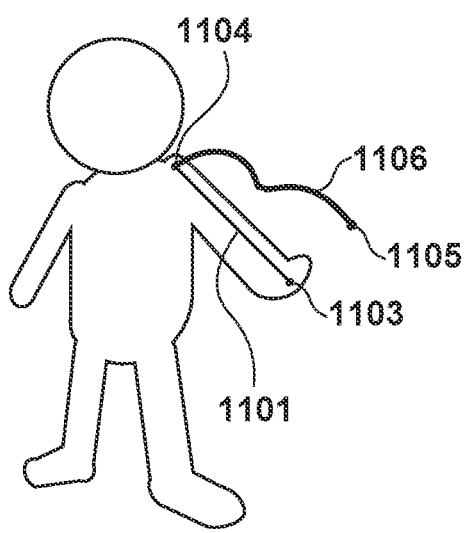

Note that the procedure described with reference to FIGS. 11A and 11B is merely an example, and the input order of a standard line segment and a reference line segment and the input direction of a locus are not limited to those described above. In this embodiment, attribute information is added if the coordinates of the endpoints of the standard line segment do not coincide with those of the endpoints of the reference line segment. However, to explicitly indicate this, an arrangement may be adopted in which an input of a locus from the point 1105 to the point 1103 and an operation input for adding attribute information are required after the input of the reference line segment 1106 in FIG. 11B.

The attribute information need not be formed to be added to only one endpoint of the standard information. If, for example, the two endpoints of the reference line segment do not coincide with the endpoints of the standard information, attribute information may be added to each of the endpoints of the standard information. In this case, an input to designate which of the endpoints of the reference line segment corresponds to the endpoint of the standard line segment may be further accepted.

[Modification 5]

In the above embodiments and modifications, in consideration of the user convenience, a line segment input is performed by an instruction input to the target image, that is, a region where the target image is displayed. Implementation of the present invention, however, is not limited to this. For example, if the length of the standard line segment is short at the display magnification of the target image, it may be difficult to input a reference line segment having a desired shape especially when, for example, depth information indicating a complicated undulation is to be defined. Therefore, for example, assuming that only endpoint information and a standard line segment are input by an instruction input to the region where the target image is displayed, a reference line segment may be input in a different region at an arbitrary scale. In this case, the control unit 101 applies rotation/expansion and contraction processing to the input reference line segment so that the two endpoints coincide with the corresponding endpoints of the standard line segment, and stores resultant data as reference line segment information.

Note that if no standard line segment input is required (the endpoints of a reference line segment are used to define a standard line segment) as in the first embodiment, an instruction input related to the endpoints for defining the standard line segment is accepted in the display region of the target image, and the control unit 101 performs rotation/expansion and contraction processing for the additionally input reference line segment in the same manner in a combination with this modification.

SUMMARY

The above-described various modes may be configured to define depth information by combining the above-described elements, as needed. As described in Modification 5, endpoint information concerning the standard line segment for defining depth information need not be acquired based on an input related to the reference line segment, and may be acquired by an input different from the reference line segment input. Furthermore, if the standard line segment is a straight line, it is not necessary to input the standard line segment, and depth information may be defined by only the input of the endpoint information and reference line segment.

Other Embodiments

The present invention is not limited to the above embodiments and various changes and modifications can be made without departing from the spirit and scope of the present invention. An information processing apparatus according to the present invention can also be implemented by a program for causing one or more computers to function as the information processing apparatus. This program can be provided/distributed by being recorded in a computer-readable recording medium or via an electrical communication line. Therefore, to apprise the public of the scope of the present invention, the following claims are made.

What is claimed is:

1. A non-transitory computer-readable recording medium recording a program for causing a computer to execute:
    a process of acquiring image data at the computer, the image data comprising a 2D image corresponding to a 2D object as a definition target of depth information;
    a process of accepting, for the acquired 2D image, an input of point information for designating two points on the image and an input of line segment information indicating a first line segment as a standard of a depth;
    a process of setting, for a point on a second line segment connecting the two points on the 2D image indicated by the point information, depth information based on the first line segment indicated by the line segment information; and
    a process of generating, based on the set depth information, a 3D model or depth map corresponding to the 2D object,
    wherein the first line segment is a locus of an input position based on successive operation inputs,
    the two points indicated by the point information are endpoints of the first line segment, and
    the process of setting sets, for the point on the second line segment, depth information corresponding to a distance between the point on the second line segment and a corresponding point on the first line segment.

2. The recording medium according to claim 1, wherein the program further causes the computer to execute a process of performing an input related to the second line segment.

3. The recording medium according to claim 1, wherein the point on the first line segment corresponding to the point on the second line segment is an intersecting point of the first line segment and a straight line extending from the point on the second line segment in a predetermined direction within a plane of the 2D image.

4. The recording medium according to claim 1, wherein the process of accepting the input further accepts an input of positive/negative information indicating whether the line segment information is information for determining a depth in one of a positive depth direction and a negative depth direction, and the process of setting sets depth information for the point on the second line segment based on the positive/negative information.

5. The recording medium according to claim 1, wherein if depth information has already been set for the point on the second line segment, the process of setting sets new depth information by adding a value based on the first line segment to a value indicated the already set depth information.

6. The recording medium according to claim 1, wherein the process of accepting the input further accepts information indicating an application ratio of the line segment information, and the process of setting sets, for the point on the second line segment, depth information based on the information indicating the application ratio.

7. The recording medium according to claim 1, wherein the program further causes the computer to execute processing of defining a region corresponding to the same part with respect to the 2D image, and the process of setting sets, for the region corresponding to the same part defined by the process of defining, depth information of another point within the region based on a plurality of second line segments for which pieces of depth information have been set.

8. The recording medium according to claim 1, wherein the program further causes the computer to execute:
    a process of forming a 3D shape based on the depth information set by the processing of setting, and
    a process of displaying, together with the 2D image, the 3D shape formed by the processing of forming.

9. The recording medium according to claim 1, wherein a distance between the second line segment and the first line segment is modifiable via the successive operation inputs while maintaining the two points as endpoints of the first line segment and the second line segment.

10. The recording medium according to claim 1, wherein a shape of the second line segment is curved between the two points.

11. An information processing apparatus having a central processing unit (a CPU), wherein,
    the CPU is configured to:
    acquire a 2D image corresponding to a 2D object as a definition target of depth information;
    accept, for the 2D image acquired by the acquirer, an input of point information for designating two points on the image and an input of line segment information indicating a first line segment as a standard of a depth;
    set, for a point on a second line segment connecting the two points on the 2D image indicated by the point information, depth information based on the first line segment indicated by the line segment information; and
    generate, based on the set depth information, a 3D model or depth map corresponding to the 2D object,
    wherein the first line segment is a locus of an input position based on successive operation inputs,
    the two points indicated by the point information are endpoints of the first line segment, and
    the CPU sets, for the point on the second line segment, depth information corresponding to a distance between the point on the second line segment and a corresponding point on the first line segment.

12. A depth definition method comprising:
    acquiring, at a computing system, image data comprising a 2D image corresponding to a 2D object as a definition target of depth information;
    accepting, at a user interface of the computing system, and for the 2D image acquired in the acquisition step, an input of point information for designating two points on the image and an input of line segment information indicating a first line segment as a standard of a depth;

setting, at the computing system, for a point on a second line segment connecting the two points on the 2D image indicated by the point information, depth information based on the first line segment indicated by the line segment information; and generating, at the computing system, a 3D model or depth map corresponding to the 2D object based on the set depth information, wherein the first line segment is a locus of an input position based on successive operation inputs, the two points indicated by the point information are endpoints of the first line segment, and depth information corresponding to a distance between the point on the second line segment and a corresponding point on the first line segment is set for the point on the second line segment.

* * * * *